United States Patent
Bradburn et al.

(10) Patent No.: US 8,750,943 B2
(45) Date of Patent: Jun. 10, 2014

(54) VEHICLE TELEMATICS COMMUNICATION FOR WELL-BEING CHECKS

(75) Inventors: Travis Lyle Bradburn, Ortonville, MI (US); Laura R. Chmielewski, Huntington Woods, MI (US)

(73) Assignee: General Motors LLC, Detroit, MI (US)

( * ) Notice: Subject to any disclaimer, the term of this patent is extended or adjusted under 35 U.S.C. 154(b) by 1406 days.

(21) Appl. No.: 12/342,108

(22) Filed: Dec. 23, 2008

(65) Prior Publication Data

US 2010/0159869 A1  Jun. 24, 2010

(51) Int. Cl.
*H04M 11/04* (2006.01)
*H04W 4/22* (2009.01)

(52) U.S. Cl.
USPC .............. 455/569.2; 455/404.1; 455/415; 455/418; 455/420; 455/556.1

(58) Field of Classification Search
USPC ........ 455/404.1, 556.1, 415, 420, 569.2, 418, 455/419, 575.9
See application file for complete search history.

(56) References Cited

U.S. PATENT DOCUMENTS

| | | | |
|---|---|---|---|
| 2004/0203672 A1* | 10/2004 | Crocker et al. | 455/415 |
| 2005/0215282 A1* | 9/2005 | Oesterling et al. | 455/556.1 |
| 2005/0261035 A1* | 11/2005 | Groskreutz et al. | 455/569.2 |
| 2006/0082471 A1* | 4/2006 | Rockett et al. | 340/988 |
| 2006/0276184 A1* | 12/2006 | Tretyak et al. | 455/418 |
| 2007/0038510 A1* | 2/2007 | Laghrari et al. | 705/14 |
| 2007/0155412 A1* | 7/2007 | Kaltsukis | 455/466 |
| 2010/0136944 A1* | 6/2010 | Taylor et al. | 455/404.1 |

* cited by examiner

*Primary Examiner* — Jinsong Hu
*Assistant Examiner* — Jean Chang
(74) *Attorney, Agent, or Firm* — Anthony Luke Simon; Reising Ethington P.C.

(57) ABSTRACT

A method and system for attempting contact with a person via a vehicle telematics unit. The method carried out by the system involves receiving a request for well-being check of a person, placing a call to that person's vehicle, and performing a well-being check if the person answers the call. If the call is not answered, then the method further involves setting a vehicle trigger, presenting a well-being check message to the occupant upon occurrence of the trigger, receiving a return call from the vehicle, and communicating with the occupant over the return call to verify the person's well-being and offer any needed assistance.

20 Claims, 3 Drawing Sheets

VEHICLE TELEMATICS COMMUNICATION FOR WELL-BEING CHECKS

TECHNICAL FIELD

The present invention relates generally to vehicle telematics systems and, more particularly, to techniques for communicating to missing persons and checking on their well-being.

BACKGROUND OF THE INVENTION

Vehicle telematics are becoming more commonly used in consumer and commercial vehicles and are now a standard feature in several models. Other vehicles may have them as part of an add-on package. They may include safety, communication, vehicle diagnostic, and entertainment features. The telematics system can be used by the driver or other occupant for various purposes such as to place a personal phone call, obtain navigation or roadside assistance, to browse the web, etc. Also, the telematics system can automatically initiate communication with a call center or other remote location for purposes such as reporting an possible accident and uploading vehicle diagnostic data. Another use of the telematics systems that has emerged is in connection with missing persons or other well-being checks. In such instances, a common search strategy may include informing a law enforcement authority, posting a photo and some information of a missing person in a printed (e.g., newspaper, newsletter, or flyer) or digital media (e.g., website), utilizing local or national media (e.g., television or radio station commercial, show, or alert), or hiring a professional search person or agency. An additional approach that is sometimes done is to contact a vehicle telematics service provider (call center) and request that an advisor at the call center telephone the vehicle via its telematics unit in hopes of establishing contact with the person.

SUMMARY OF THE INVENTION

According to an aspect of the invention, there is provided a method of attempting contact with a person via a vehicle telematics unit, comprising the steps of (a) receiving a request for a well-being check of a person; (b) placing a call to a vehicle associated with the person; (c) performing a well-being check of the person if the call is answered; and (d) if the call is not answered, then: (d1) setting a vehicle trigger that is responsive to vehicle operation by an occupant; (d2) presenting a well-being check message to the occupant upon occurrence of the trigger; (d3) receiving a return call from the vehicle at a call center; and (d4) communicating with the occupant over the return call.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The system and methods described below are directed to different embodiments of an approach for attempting contact with a person via a vehicle telematics unit. The disclosed methods enable the telematics service's call center to perform a missing person/well-being check in a manner that provides the call center adviser with the ability to place a call to a vehicle associated with a person and perform a well-being check of the person if the call is answered; and if unable to reach the person at the vehicle, set a vehicle trigger that is responsive to the vehicle operation by an occupant to help ensure that the person will be contacted upon his/her return to the vehicle.

Communications System

Figure 1:
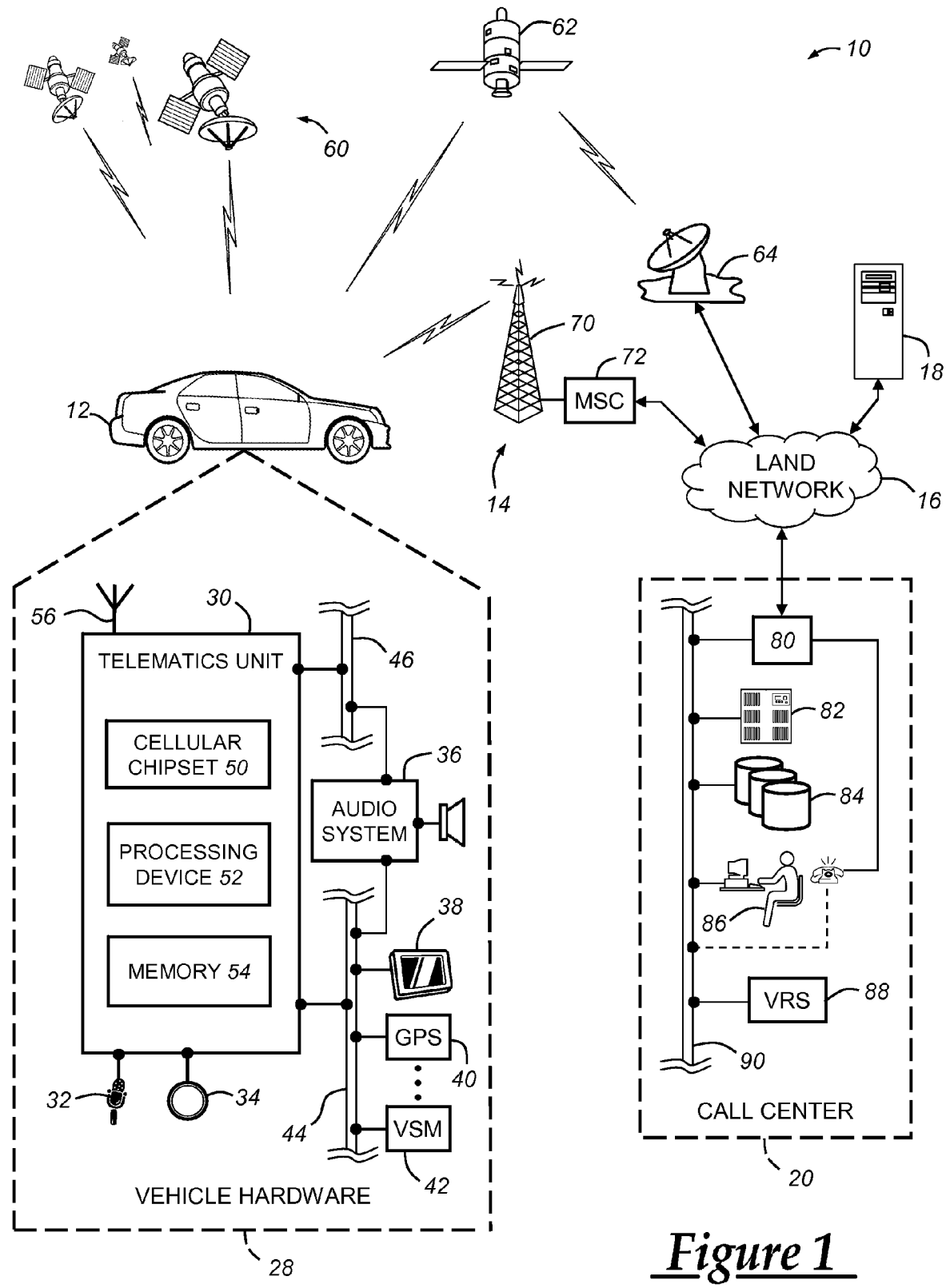
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live adviser or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisers 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live adviser phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live adviser 86, it will be appreciated that the call center can instead utilize VRS 88 as an automated adviser or, a combination of VRS 88 and the live adviser 86 can be used.

Method

Figure 2:
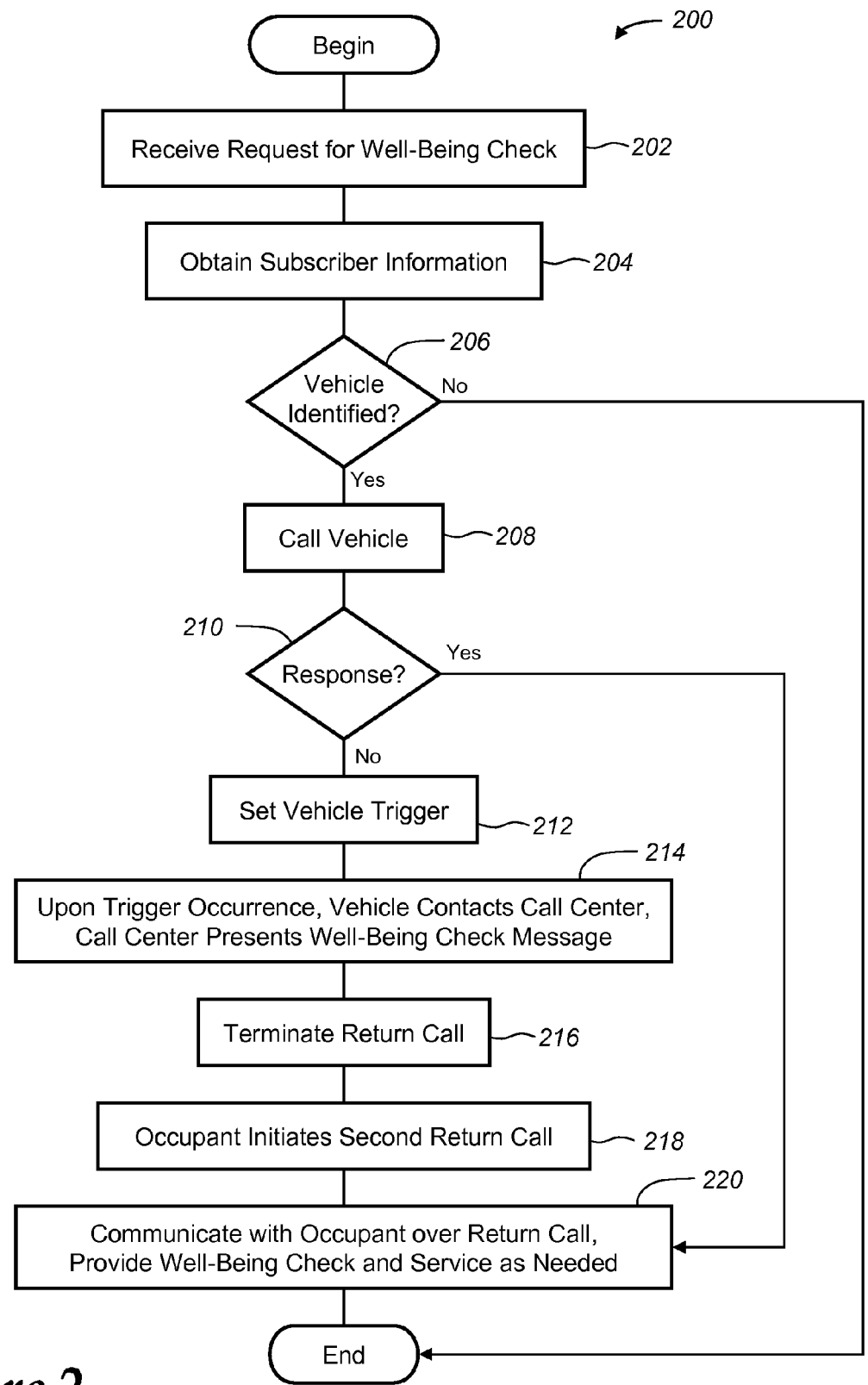
FIG. 2 is a flowchart depicting one embodiment of a method of attempting contact with a person via a telematics unit.

Turning now to FIG. 2, there is shown a method 200 for initiating missing persons/well-being checks. The method 200 starts at step 202 and begins by receiving a request for a well-being check of a person. This request may be initiated by a law enforcement officer, a family member, or some other requester. Upon receiving this request, the call center 20 at step 204 obtains any needed or desired subscriber information associated with the person, such as driver's name, vehicle's license plate number, VIN, etc. This subscriber information can be any information sufficient for the call center to determine which vehicle to contact. The call center 20 can also confirm that vehicle 12 is authorized for well-being check assistance as a precursor to step 208. The authorization may have been provided earlier according to the service subscriber's wishes. This authorization can be obtained from the customer as part of his or her enrollment in a particular telematics service plan provided by the call center 20, or can be a service that the customer opts into, or can be a default capability of the system that is provided unless the customer specifically opts out.

If, based on the information received by the call center, the call center is able to properly identify a vehicle to contact (step 206), then, at step 208, an advisor at the call center 20 places a call to the vehicle 12. This call may be placed while the requestor is still on call to call center 20 (e.g., with the requestor on hold or conferenced in with the call being placed to the vehicle). If the driver answers the call then the call center 20 will provide a well-being check and services as needed, as summarized in step 220. If the call with the requestor is still active (e.g., on hold), then the call center can connect the two calls together if desired so that the requester and occupant can speak directly with each other. The process then ends.

If, at step 210, the occupant does not answer the call then the call center 20 will cause a vehicle trigger to be set in the vehicle 12. This trigger will be used to initiate a call to the call center 20 under circumstances in which a person is determined to be at the vehicle and, thus, likely to be available for communicating with the call center. Thus, at step 212 a vehicle trigger is set. Setting the trigger may be achieved by sending a telematics command to enable a code number already preprogrammed in the vehicle 12 which corresponds to the well-being check service. Another option may consist of sending an entire command to the telematics unit 30 or some other VSM 42 to program the vehicle to perform a well-being check service. The trigger may wait for an event (e.g., vehicle ignition is turned on) or series of events (e.g., vehicle ignition is turned on and all doors are closed, etc.). Preferably the method uses a trigger that is responsive to vehicle operation by an operator. This can take a variety of different forms; for example, an ignition trigger that occurs upon the vehicle ignition being activated. Or, a trigger that occurs in response to a shift between gears in the vehicle transmission. Or, a mileage trigger that occurs after a certain number of miles has elapsed (e.g., one or more miles from the current reading). Other such triggers will become apparent to those skilled in the art.

Once the trigger condition has occurred (step 214), then the vehicle 12 automatically initiates a return call to the call center 20 and a well-being message is presented to the vehicle occupant. This involves the telematics unit 30 automatically placing a call to the call center upon occurrence of the trigger, followed by the call center playing a pre-recorded well-being check message over the phone call. The message presentation may be an audible message played within the vehicle 12, for example using audio system 36, or a graphic one displayed on a visual display 38, or any other combinations. The well-being check message can include a request to place a call to the call center to speak to an advisor, a request to hold to speak to an advisor, or any other requests. In the embodiment of FIG. 2, the message requests that the occupant contact the call center, for example, by a manually-initiated return call which the occupant can initiate by pressing button 34, providing a voice command via microphone 32, or using a separate cellular device to contact the call center. This gives the occupant the ability to decide whether or not they wish to respond to the well-being check. The trigger-initiated return call from the vehicle is then terminated automatically after presentation of a well-being check message, as indicated at step 216. In another embodiment, the automatic return call is not terminated, but is either switched to an advisor or the occupant is given the option of switching the call over to an advisor.

At step 218, the occupant manually initiates a second return call to the call center, if he or she so desires. Finally, at step 220, the call center 20 answers this second return call and communicates with the occupant over the call. An adviser may respond to the occupant informing him/her about the well-being check request and offer any services or assistance that may be needed, such as providing emergency aid, connecting the occupant with the requester or law enforcement, etc. The process then ends.

Figure 3:
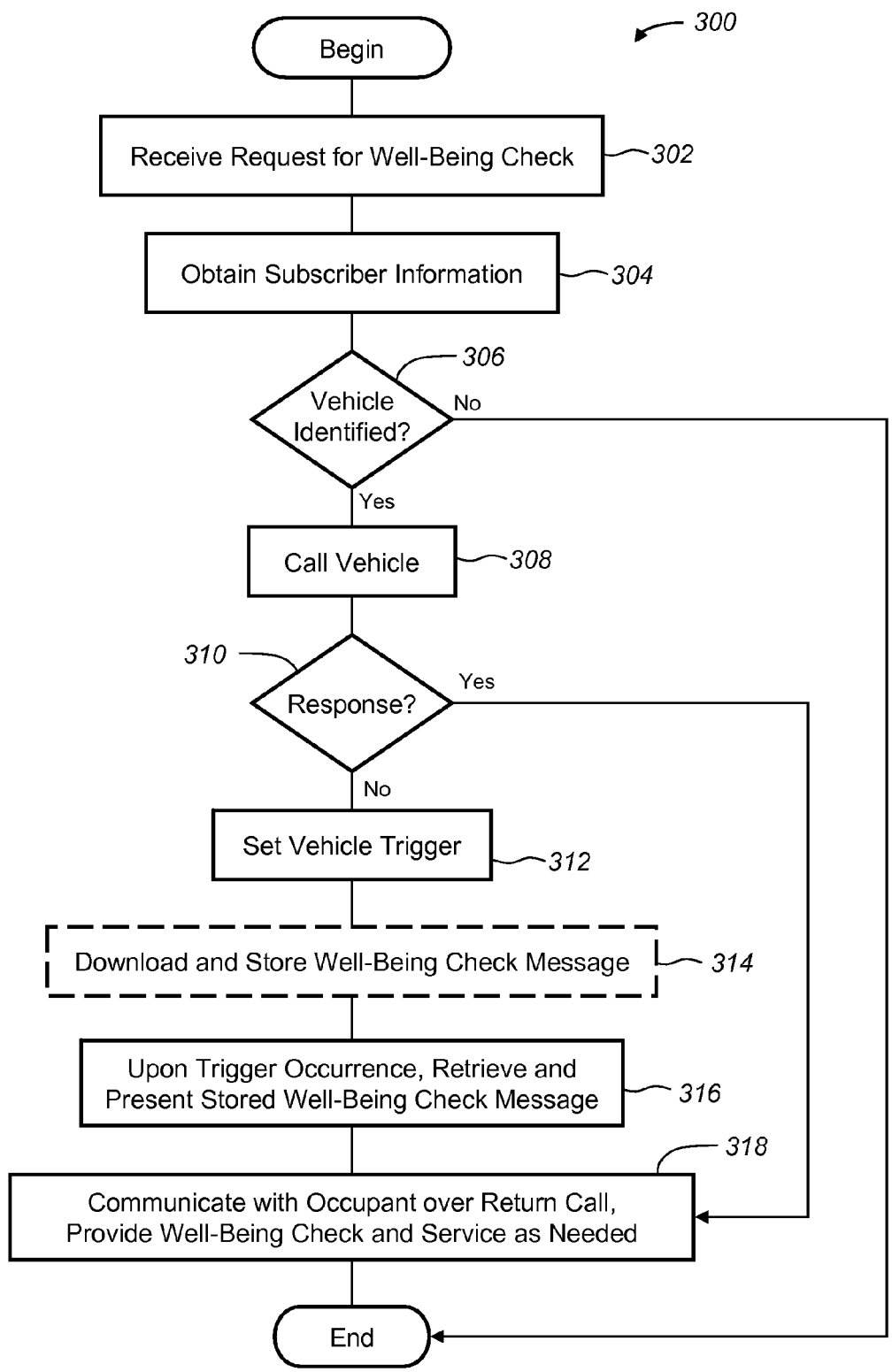
FIG. 3 is a flowchart showing a second embodiment of a method of attempting contact with a person via a telematics unit.

Turning now to FIG. 3, a second embodiment will be described. The portions of this embodiment in common with or similar to that of FIG. 2 can be carried out as described above. This embodiment differs from that of FIG. 2 primarily in that the well-being check message is pre-stored at the vehicle before presentation to the occupant, rather than being downloaded over a dedicated call following occurrence of the trigger. For this purpose the well-being check message can either be pre-stored at the vehicle (such as during manufacturing or initial setup of the vehicle or its telematics unit) or can be downloaded and stored at the vehicle during the call from the call center in which the trigger is set. Then, upon occurrence of the trigger, the stored message at the vehicle can be presented to the occupant without the need for contacting the call center to retrieve it. Thus, for example, a generic well-being check message can be pre-stored in the vehicle even before any well-being check is requested, or a generic or individualized message can be downloaded to the vehicle at the time of the request for a well-being check. In any of the embodiments, the occurrence of the trigger and/or the presentation of the well-being message can be logged in memory at the vehicle or call center for subsequent access so that it may be confirmed that the message was, in fact, presented.

The method 300 begins at step 302 where the call center 20 receives a request for a well-being check. Then, the call center obtains any needed information at step 304 necessary to identify the proper vehicle to be contacted (step 306). Assuming the vehicle is identified, then at step 308, the call center calls the vehicle 12 in an attempt to reach the person. If the call is answered then at step 318 the adviser performs a well-being check including providing any needed services or assistance and, if desired, connects the requester and occupant calls together, and the process ends. These steps can be implemented as discussed above in connection with FIG. 2.

If there is no response from the advisor's call to the vehicle, then a vehicle trigger such as an ignition trigger or a mileage trigger is set, step 312. Where the system uses a generic, pre-stored message for the well-being check, nothing further need be done at the time of setting the trigger. However, the method can optionally download during this call (step 314) a generic or individualized message for subsequent presentation to the person once the trigger occurs. The individualized message can be one created by the advisor or, in addition to or in lieu of the advisor's message, can be a voice message or other communication from the requester. Whatever the source, content, and form of the message, it is stored at the vehicle. Then, when the trigger occurs at step 316, the stored well-being check message is presented to the occupant. Assuming the occupant places a return call to the call center, then at step 318 an advisor at the call center can communicate with the occupant over the return call and offer any needed services or assistance, as discussed above. The process then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of attempting contact with a person via a vehicle telematics unit, comprising the steps of:
   (a) receiving a request for a well-being check of a person at a call center using an automated voice response system;
   (b) retrieving information associated with the person at the call center from a database in response to the well-being check;
   (c) placing a call to a vehicle associated with the person using information retrieved from the database;
   (d) generating a well-being check of the person through an audio system or a vehicle display of the vehicle if the call is answered; and
   (e) if the call is not answered, then:
      (e1) automatically transmitting a telematics command that sets a vehicle trigger and is responsive to vehicle operation by an occupant;
      (e2) presenting a well-being check message to the occupant through the audio system or via the vehicle display of the vehicle upon occurrence of the trigger;
      (e3) prompting the occupant to place a return call from the vehicle at a call center using a message played by the audio system or the vehicle display of the vehicle; and
      (e4) communicating with the occupant over the return call at the call center.

2. The method of claim 1, wherein step (a) further comprises receiving a missing persons request from police.

3. The method of claim 1, wherein step (b) further comprises placing the call if previous authorization for well-being checks has been received from a subscriber associated with the vehicle.

4. The method of claim 1, wherein step (a) further comprises receiving the request at a call center via a phone call from a requestor and step (b) further comprises placing the call from an adviser at the call center.

5. The method of claim 4, wherein step (b) further comprises placing a call to the vehicle while the phone call with the requestor is still active and, if the call to the vehicle is answered by the person, connecting the two calls together so that the requestor can speak with the person.

6. The method of claim 1, wherein step (d1) further comprises setting an ignition trigger.

7. The method of claim 1, wherein step (d1) further comprises setting a mileage trigger.

8. The method of claim 1, wherein step (d1) further comprises downloading the well-being check message to the vehicle upon setting the trigger and storing the message at least until occurrence of the trigger.

9. The method of claim 1, wherein step (d2) further comprises automatically placing a telephone call to the call center in response to the trigger and playing a voice message for the occupant over the telephone call.

10. The method of claim 1, wherein step (d2) further comprises presenting the well-being check message as an audible message played within the vehicle.

11. The method of claim 1, wherein step (d2) further comprises presenting the well-being check message as a text message within the vehicle.

12. The method of claim 1, wherein step (d2) further comprises presenting a well-being check message requesting the occupant to call the call center.

13. The method of claim 1, wherein step (d3) further comprises placing the return call in response to a call initiating input by the occupant.

14. The method of claim 1, wherein step (d3) further comprises placing the return call automatically in response to occurrence of the trigger.

15. The method of claim 1, wherein step (d4) further comprises playing a voice message from the requestor to the occupant over the telephone call.

16. A method of attempting contact with a person via a vehicle telematics unit, comprising the steps of:
   (a) receiving at a call center using an automated voice response system a request for a well-being check of a person;
   (b) accessing subscriber information associated with the person at the call center from a database in response to the well-being check;
   (c) identifying a vehicle based on the subscriber information accessed from the database;
   (d) placing a call from the call center to the vehicle using information retrieved from the database;
   (e) presenting a message via an audio system or a display in the vehicle to perform a well-being check of the person if the call is answered; and
   (f) if the call is not answered, then:
      (f1) automatically transmitting a telematics command that sets a trigger in the vehicle;
      (f2) receiving a first, automatic return call at the call center from the vehicle following occurrence of the trigger;
      (f3) supplying a pre-recorded well-being check message to the vehicle over the automatic return call prior to the return call being terminated;
      (f4) receiving a second, manually-initiated return call from an occupant in the vehicle; and
      (f5) communicating with the occupant over the second return call.

17. The method of claim 16, wherein step (f1) further comprises setting an ignition trigger.

18. The method of claim 16, wherein step (f3) further comprises supplying the well-being check message as a voice message played over the first return call.

19. The method of claim 16, wherein step (f3) further comprises supplying a well-being check message requesting the occupant to call the call center.

20. The method of claim 16, wherein step (a) further comprises receiving the request at the call center from a requestor and recording a voice message from the requestor, and wherein the method further comprises playing the voice message from the requestor to the occupant over one of the return calls.

* * * * *